(12) United States Patent
Schrum, Jr. et al.

(10) Patent No.: US 8,824,477 B2
(45) Date of Patent: Sep. 2, 2014

(54) MULTIPLE DELIVERY ROUTE PACKET ORDERING

(75) Inventors: Sidney B. Schrum, Jr., Ocala, FL (US); Richard E. Newman, Gainsville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 13/288,319

(22) Filed: Nov. 3, 2011

(65) Prior Publication Data

US 2013/0114606 A1    May 9, 2013

(51) Int. Cl.
*H04L 12/28* (2006.01)

(52) U.S. Cl.
USPC ............ 370/394; 370/252; 370/392; 370/401

(58) Field of Classification Search
None
See application file for complete search history.

(56) References Cited

U.S. PATENT DOCUMENTS

| | | | |
|---|---|---|---|
| 5,430,710 A | | 7/1995 | Mueller et al. |
| 5,946,309 A | * | 8/1999 | Westberg et al. ......... 370/395.3 |
| 6,130,896 A | | 10/2000 | Lueker et al. |
| 6,243,360 B1 | | 6/2001 | Basilico |
| 6,245,684 B1 | * | 6/2001 | Zhao et al. ................... 438/704 |
| 6,272,551 B1 | | 8/2001 | Martin et al. |
| 6,947,379 B1 | * | 9/2005 | Gleichauf et al. ............ 370/229 |
| 6,947,736 B2 | | 9/2005 | Shaver et al. |
| 6,970,419 B1 | | 11/2005 | Kalkunte et al. |
| 6,970,420 B1 | | 11/2005 | Kalkunte et al. |
| 6,973,031 B1 | | 12/2005 | Kalkunte et al. |
| 7,113,763 B2 | | 9/2006 | Heinonen et al. |
| 7,159,034 B1 | | 1/2007 | Rai |
| 7,262,695 B2 | | 8/2007 | Hicks |
| 7,269,403 B1 | | 9/2007 | Miao |
| 7,349,325 B2 | | 3/2008 | Trzeciak et al. |
| 7,391,317 B2 | | 6/2008 | Abraham et al. |
| 7,415,028 B1 | | 8/2008 | Allam |
| 7,440,443 B2 | | 10/2008 | Logvinov et al. |

(Continued)

FOREIGN PATENT DOCUMENTS

| | | |
|---|---|---|
| EP | 0462540 A2 | 12/1991 |
| EP | 0895379 A1 | 2/1999 |

(Continued)

OTHER PUBLICATIONS

International Search Report and Written Opinion—PCT/US2012/063359—ISA/EPO—May 6, 2013.

(Continued)

*Primary Examiner* — Duc C Ho
(74) *Attorney, Agent, or Firm* — DeLizio Gilliam, PLLC

(57) ABSTRACT

A hybrid network device can implement functionality to indicate the sequence of packets associated with a common packet stream transmitted via a plurality of packet routes and to manage out-of-order packet arrival. In a hybrid communication network, a first network device can determine sequence identifiers associated with a plurality of packets of a packet stream received from a second network device via a plurality of packet routes between the first network device and the second network device. The first network device can detect out-of-order delivery of one or more of the plurality of received packets based, at least in part, on the sequence identifiers associated with the plurality of packets. Consequently, the first network device can re-order at least a subset of the plurality of packets based on the sequence identifiers associated with the plurality of packets.

30 Claims, 6 Drawing Sheets

(56) References Cited

U.S. PATENT DOCUMENTS

| | | |
|---|---|---|
| 7,492,772 B2 | 2/2009 | Nam et al. |
| 7,583,952 B2 | 9/2009 | Lee et al. |
| 7,725,096 B2 | 5/2010 | Riveiro et al. |
| 7,751,414 B2 | 7/2010 | Lee et al. |
| 7,769,002 B2 | 8/2010 | Gong et al. |
| 7,835,743 B2 | 11/2010 | Zhang et al. |
| 7,899,057 B2 | 3/2011 | Noble |
| 8,437,267 B2 * | 5/2013 | Amir et al. ............... 370/252 |
| 2002/0150039 A1 | 10/2002 | Valdevit |
| 2005/0180327 A1 * | 8/2005 | Banerjee et al. .......... 370/236 |
| 2006/0187955 A1 | 8/2006 | Rezaiifar et al. |
| 2007/0076666 A1 | 4/2007 | Riveiro et al. |
| 2007/0130598 A1 | 6/2007 | Choi et al. |
| 2007/0195799 A1 | 8/2007 | Kanazawa et al. |
| 2007/0229231 A1 | 10/2007 | Hurwitz et al. |
| 2008/0080380 A1 | 4/2008 | Lee et al. |
| 2008/0130640 A1 | 6/2008 | Hurwitz et al. |
| 2008/0159288 A1 | 7/2008 | Nagarajan et al. |
| 2008/0205406 A1 | 8/2008 | Hatakeyama |
| 2009/0156159 A1 | 6/2009 | Lim et al. |
| 2009/0252209 A1 | 10/2009 | Riveiro et al. |
| 2009/0323829 A1 | 12/2009 | Riveiro et al. |
| 2013/0128738 A1 | 5/2013 | Cohen et al. |
| 2013/0132604 A1 * | 5/2013 | Cohen et al. ............. 709/231 |

FOREIGN PATENT DOCUMENTS

| | | |
|---|---|---|
| EP | 1337075 | 8/2003 |
| WO | 0027087 | 5/2000 |
| WO | 0027087 A1 | 5/2000 |
| WO | 2006089204 A2 | 8/2006 |
| WO | 2013067377 | 5/2013 |
| WO | 2013067433 | 5/2013 |

OTHER PUBLICATIONS

Partial International Search Report—PCT/US2012/063359—ISA/EPO—Feb. 18, 2013.

"PCT Application No. PCT/US2012/063425 International Search Report", Feb. 18, 2013, 11 pages.

Co-pending U.S. Appl. No. 13/288,313, filed Nov. 3, 2011, pp. 52.

"1905.1-2013—IEEE Standard for a Convergent Digital Home Network for Heterogeneous Technologies", http://standards.ieee.org/findstds/standard/1905.1-2013.html (obtained from internet Feb. 10, 2014 , 1 page.

"802.1Q-2011—IEEE Standard for Local and metropolitan area networks—Media Access Control (MAC) Bridges and Virtual Bridged Local Area Networks", http://standards.ieee.org/findstds/standard/802.1Q-2011.html (date obtained from the internet Feb. 10, 2014) , 1 page.

"PCT Application No. PCT/US2012/063425 International Preliminary Report on Patentability", Jan. 21, 2014 , 6 pages.

"PCT Application No. PCT/US2012/063425, Written Opinion of the IPEA", Oct. 17, 2013 , 5 pages.

"US Appl. No. 13/288,313 Office Action", Oct. 24, 2013 , 12 pages.

"U.S. Appl. No. 13/288,313 Final Office Action", Mar. 4, 2014, 11 pages.

"International Application No. PCT/US2012/063359 Written Opinion of the IPEA", Apr. 10, 2014, 7 pages.

* cited by examiner

MULTIPLE DELIVERY ROUTE PACKET ORDERING

BACKGROUND

Embodiments of the inventive subject matter generally relate to the field of communication systems and, more particularly, to multiple delivery route packet ordering.

Hybrid communication networks typically comprise multiple networking technologies (e.g., wireless local area network (WLAN) technologies, powerline communication technologies, Ethernet, etc.) that are interconnected using bridging-capable devices that forward packets between the different network technologies and media in order to form a single extended communication network. Typically, the communication mechanisms, and protocol specifics (e.g., device and topology discovery, bridging to other networks, etc.) are unique to each networking technology. The hybrid communication network can provide different routes associated with one or more of the different network technologies to deliver packets from a source network device to a destination network device.

SUMMARY

Various embodiments for packet ordering in a multiple packet delivery route environment are disclosed. In one embodiment, a first network device of a communication network determines sequence identifiers associated with a plurality of packets associated with a packet stream received from a second network device via a plurality of packet routes between the first network device and the second network device. A subset of the plurality of packets are received at the first network device via each of the plurality of packet routes. Out-of-order delivery of one or more of the plurality of packets associated with the packets stream received via the plurality of packet routes is detected based, at least in part, on the sequence identifiers associated with the plurality of packets. At least a subset of the plurality of packets are re-ordered based on the sequence identifiers associated with the plurality of packets in response to detecting out-of-order delivery of one or more of the plurality of packets associated with the packets stream received via the plurality of packet routes.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
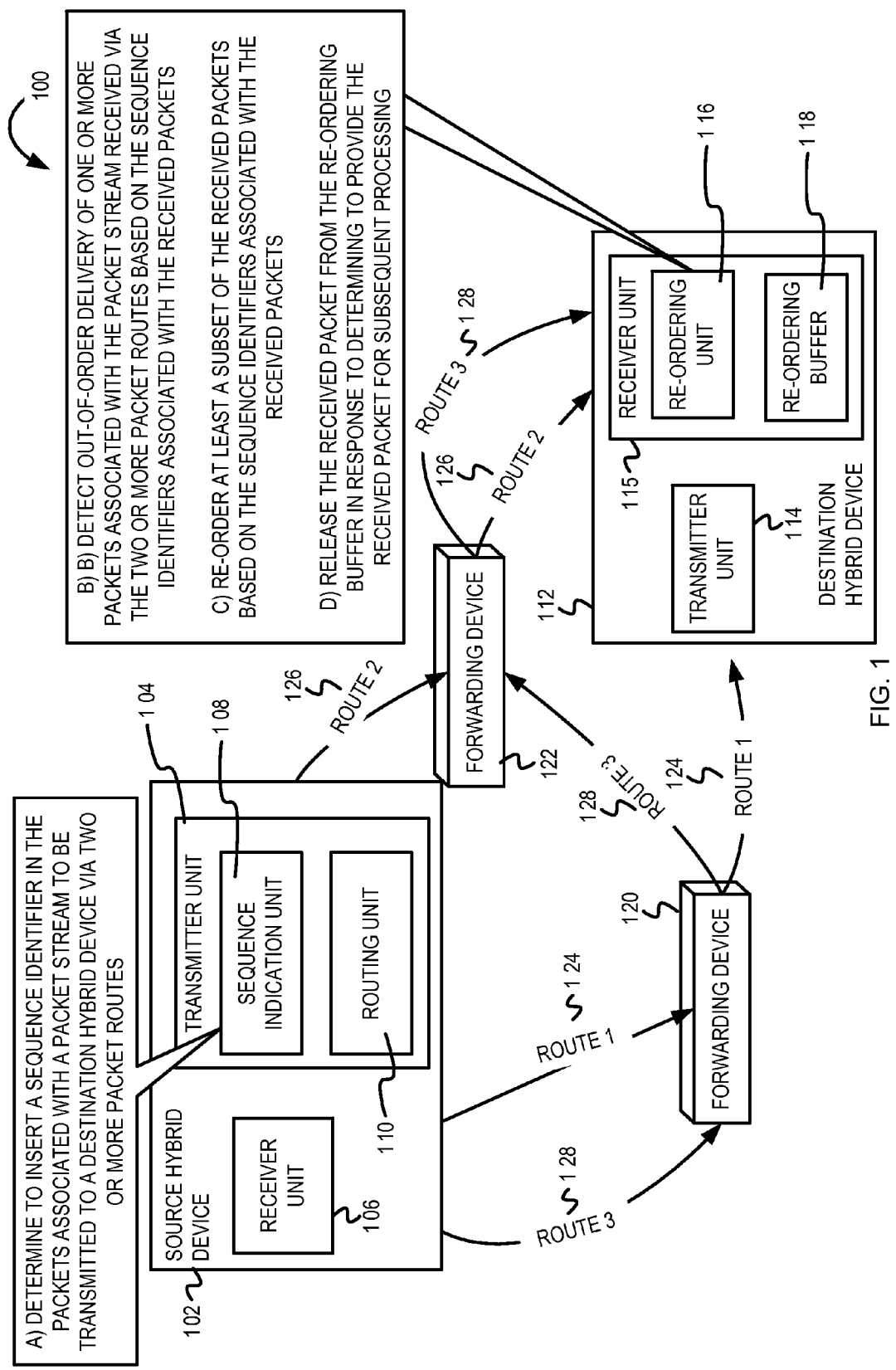
FIG. 1 is a block diagram illustrating an example packet re-ordering mechanism in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments the packet ordering mechanism can be implemented for hybrid communication networks comprising wireless local area network (WLAN) devices (e.g., IEEE 802.11 devices), powerline network devices (e.g., HomePlug AV) and Ethernet devices, in other embodiments the packet ordering mechanism can be implemented in hybrid communication networks that may comprise other suitable types of network devices that implement other standards/protocols (e.g., WiMAX, etc.). In other instances, well-known instruction instances, protocols, structures, and techniques have not been shown in detail in order not to obfuscate the description.

A source communication device typically transmits data to a destination communication device in an ordered sequence of packets. As part of analyzing the received data, the destination communication device typically ensures that the packets are processed in the same order in which they were transmitted by the source communication device. Conventional communication networks typically provide a single route through the network between two communication devices because the source and the destination communication devices utilize only a single interface for communicating with each other. However, hybrid communication networks are typically formed as an interconnection of communication network segments (or sub-networks) across different network technologies and communication media. The hybrid communication networks can comprise hybrid devices that have multiple network interfaces and that are configured to operate across the different network technologies. The hybrid devices can use any one of the multiple network interfaces to transmit/receive packets via the hybrid communication network. Consequently, multiple routes may exist between a source hybrid device and a destination hybrid device. For example, if the source and the destination hybrid devices each includes three network interfaces, at least nine routes may exist between the source and the destination hybrid devices. Because the hybrid communication network can provide multiple routes between the source and the destination hybrid devices, and because the source hybrid device may simultaneously use multiple network interfaces (and multiple packet routes) to transmit packets associated with the same packet stream, one or more packets may arrive out-of-order at the destination hybrid device. Out-of-order packet arrival can disrupt operations of upper protocol layers or applications of the destination hybrid device. Existing techniques for managing out-of-order packets are typically optimized for conventional communication devices that comprise a single network interface, for conventional communication networks that provide only a single route between communication devices, or for communication devices that only use a single route even if multiple routes are available. In some protocols for managing out-of-order packets, out-of-order packet arrival can trigger congestion control at the source device which, in turn, can result in low throughput due to congestion control throttling mechanisms. Furthermore, some communication protocols (e.g., user datagram protocol (UDP)) employed by the destination hybrid device may not comprise inbuilt packet re-ordering mechanisms. The absence of reliable mechanisms to manage out-of-order packets at the destination hybrid device can reduce performance and throughput of the hybrid devices.

In some embodiments, hybrid devices can implement a mechanism to manage out-of-order packet arrival that results from using multiple routes to deliver a stream of packets. In one embodiment, a source hybrid device can indicate a sequence identifier associated with each packet scheduled to be transmitted to a destination hybrid device. The source hybrid device can also determine a packet stream associated with each of the packets scheduled to be transmitted. Based on the packet stream, the source hybrid device can determine two or more packet routes from a plurality of packet routes on which to transmit the packets. The source hybrid device may actively switch between multiple packet routes to transmit packets that are associated with the same packet stream. In response to receiving a packet, the destination hybrid device can identify packets that are associated with the same packet stream and that were received via multiple packet routes. The destination hybrid device can use the sequence identifier associated with the received packet and sequence identifiers associated with previously received packets (that belong to the same packet stream) to determine whether the received packet is out-of-order. Based on the sequence identifiers, the destination hybrid device can re-order packets associated with the packet stream and can release the packets in the appropriate order for subsequent processing. These and other mechanisms for indicating packet order and for re-ordering out-of-order packets based on sequence identifiers, as described herein can enable the destination hybrid device to manage out-of-order packet arrival that can result from using multiple packet routes to transmit packets associated with the same packet stream.

FIG. 1 is a block diagram illustrating an example packet re-ordering mechanism in a hybrid communication network 100. The hybrid communication network 100 comprises hybrid devices 102 and 112 and forwarding devices 120 and 122. The hybrid device 102 comprises a transmitter unit 104 and a receiver unit 106. The transmitter unit 104 comprises a sequence indication unit 108 and a routing unit 110. The hybrid device 112 also comprises a transmitter unit 114 and a receiver unit 115. The receiver unit 115 comprises a re-ordering unit 116 and a re-ordering buffer 118. Although not depicted in FIG. 1, the receiver unit 106 of the hybrid device 102 can also comprise a re-ordering unit and a re-ordering buffer. Likewise, although not depicted in FIG. 1, the transmitter unit 114 of the hybrid device 112 can also comprise a sequence indication unit and a routing unit. The forwarding devices 120 and 122 can be conventional (also known as legacy) communication devices or hybrid communication devices. In some implementations, the hybrid devices 102 and 110 can comprise multiple network interfaces each of which connect the hybrid device to different segments of the communication network (referred to herein as communication network segments or network segments). For example, the hybrid devices 102 and 110 can each comprise three network interfaces (e.g., a powerline interface, an Ethernet interface, and a WLAN interface) that enable the hybrid devices to connect to a powerline communication network segment, Ethernet, and a WLAN respectively.

Figure 2:
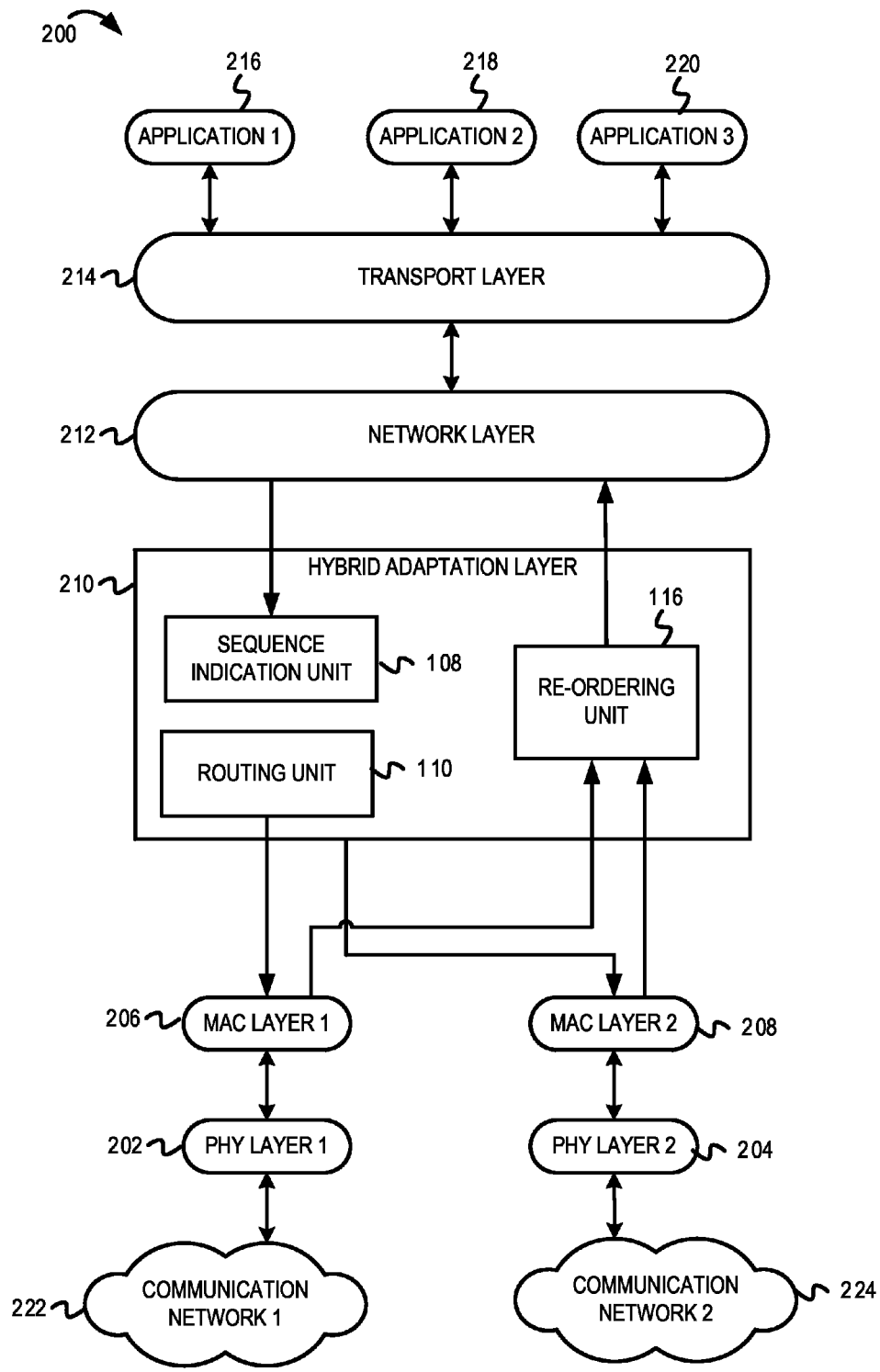
FIG. 2 is a conceptual diagram illustrating an example protocol stack for a hybrid device that implements multiple networking interfaces.

In one implementation, as depicted in FIG. 2, the networking functionality of the hybrid devices 102 and 110 can be partitioned into sub-functions using a "layered" approach, consistent with the International Standards Organization (ISO) Open Systems Interconnection (OSI) reference model. The set of networking protocol layers may be referred to as a "protocol stack." FIG. 2 depicts an example protocol stack 200 for the hybrid devices that implement multiple networking interfaces. It is noted that although the protocol stack of FIG. 2 will be described in terms of the source hybrid device 102, the destination hybrid device 112 can also implement the same (or similar) protocol stack as depicted in FIG. 2. In the example protocol stack 200 of FIG. 2, the hybrid device is associated with two communication interfaces. Therefore, the protocol stack 200 comprises two physical (PHY) layers 202 and 204 and corresponding two Medium Access Control (MAC) layers 206 and 208. The MAC layer 206 and the PHY 202 layer couple the hybrid device to one communication network segment 222 (e.g., Ethernet). Similarly, the MAC layer 208 and the PHY layer 204 couple the hybrid device to another communication network segment 224 (e.g., powerline communication network). It is noted that the communication network segments 222 and 204 can each be a portion of an extended bridged network, such as a hybrid communication network. The protocol stack 200 comprises a network layer 212. The network layer 212 can implement an Internet Protocol version 4 (IPv4) communication protocol, an Internet Protocol version 6 (IPv6) communication protocol, an AppleTalk® communication protocol, or other suitable network layer protocol. The protocol stack 200 also comprises a "hybrid adaptation layer" 210 between the network layer 212 and the MAC layers 206 and 208. In one example, as depicted in FIG. 2, the hybrid adaptation layer 210 can comprise the sequence indication unit 108, the routing unit 110, the re-ordering unit 116, and other functionality for indicating a transmission order of packets and for re-ordering out-of-order packets. As will be further described below in FIGS. 1, and 3-5, the sequence indication unit 108 can determine and indicate the sequence in which packets are (or will be) transmitted from the hybrid device. The routing unit 110 can determine two or more packet routes on which to transmit the packets associated with a packet stream to a destination device. A packet stream can comprise a sequence of packets conveying data that are associated with the same application and that are part of the same communication connection or session. In response to receiving the packets (associated with the packet stream) via the hybrid communication network 100, the re-ordering unit 116 can execute operations for determining the sequence number associated with the received packets, detecting out-of-order packet arrival at the hybrid device, and re-ordering out-of-order packets (if necessary). The protocol stack 200 also comprises a transport layer 214 that operates across the network layer 212. The transport layer 214 can comprise transmission control protocol (TCP), user datagram protocol (UDP), or other suitable transport layer protocols depending on the network layer protocol implemented by the hybrid device. The protocol stack 200 also depicts three applications 216, 218, and 220 that utilize the other protocol layers 202-214 for communication with other devices.

In some implementations, the application layer (comprising the applications 216, 218 and 220), the transport layer 214, and the network layer 212 can be collectively referred to as "upper protocol layers." The MAC layers 206 and 208 and the PHY layers 202 and 204 can be collectively referred to as "lower protocol layers." The hybrid adaptation layer 210 can implement functionality for managing communications in the hybrid device with a single set of upper protocol layers (e.g., a single network layer 212 for each network protocol type implemented and a single transport layer 214 for each transport protocol type implemented) but with multiple networking interfaces (e.g., multiple PHY layers and MAC layers). In one implementation, the hybrid adaptation layer 210 can interface with the underlying MAC layers 206 and 208 to manage networking resources and to make rapid packet route changes that are transparent to the upper layers of the protocol stack. The hybrid adaptation layer 210 can also enable the upper protocol layers to operate as if the source hybrid device 102 comprises only a single MAC layer and a corresponding single PHY layer. It is noted that the protocol stack 200 depicted in FIG. 2 illustrates one embodiment of the architecture of the hybrid devices 102 and 110. In other implementations, the hybrid devices 102 and 110 can comprise other suitable layers or sub-layers, depending on the networking technology and optional protocols that might be implemented. For example, some networking technologies may implement an Ethernet convergence layer above the MAC layer. As another example, some networking technologies may include a logical link control (LLC) protocol layer. Furthermore, one or more other sub-layers may execute functionality described herein in FIGS. 1, 3-6. Referring back to FIG. 1, the hybrid device 102 ("source hybrid device") can provide an indication of the sequence of packets, as will be described in stage A, to enable packet re-ordering (described in stages B-D) at the hybrid device 112 ("destination hybrid device").

At stage A, the sequence indication unit 108 of the source hybrid device 102 determines to insert a sequence identifier in each of a plurality of packets associated with a packet stream to be transmitted to the destination hybrid device 112 via two or more packet routes. The sequence identifier can be a time stamp, a sequence number, or another type of sequence identifier. In some implementations, the upper protocol layers (e.g., the transport protocol layer 214) of the source hybrid device 102 may insert sequence identifiers in the packets scheduled to be transmitted to the destination hybrid device 112, before providing the packets to the hybrid adaptation layer 210. The sequence identifiers inserted by the upper protocol layers are herein referred to as "primary sequence identifiers." At stage A, the sequence indication unit 108 of the hybrid adaptation layer 210 can determine whether to add a sequence identifier (e.g., generated by the hybrid adaptation layer 210) to each of the packets, that is distinct from the primary sequence identifier. The sequence identifiers generated and inserted by the hybrid adaptation layer 210 (i.e., the sequence indication unit 108) are herein referred to as "secondary sequence identifiers." As will be described further below with reference to FIG. 3, the sequence indication unit 108 can determine whether the packets comprise the primary sequence identifiers and whether to add the secondary sequence identifiers associated with the packets.

In some implementations, the hybrid communication network 100 may provide multiple packet routes between the source hybrid device 102 and the destination hybrid device 112. As depicted in the example of FIG. 1, the hybrid communication network 100 may provide three packet routes between the source hybrid device 102 and the destination hybrid device 112 via the forwarding devices 120 and 122. To transmit packets along the packet route 124, the source hybrid device 102 transmits the packets to the forwarding device 120 which, in turn, transmits the packets to the destination hybrid device 112. To transmit packets along the packet route 126, the source hybrid device 102 transmits the packets to the forwarding device 122 which, in turn, transmits the packets to the destination hybrid device 112. To transmit packets along the packet route 128, the source hybrid device 102 transmits the packets to the forwarding device 120. The forwarding device 120 transmits the packets to the forwarding device 122 which, in turn, transmits the packets to the destination hybrid device 112. In some implementations, as depicted in FIG. 1, the packet routes 124, 126, and 128 may differ in the forwarding devices (and other intermediate communication devices) that route that packet from the source hybrid device 102 to the destination hybrid device 112. In other implementations, the packet routes 124, 126, and 128 may also differ in the network interface from which the packets are transmitted ("source communication interface"), the network interface at which the packets are received ("destination communication interface"), and/or the communication network segments via which the packets are transmitted. As will be further described in FIG. 3, in some implementations, the routing unit 110 may switch between multiple packet routes for transmitting packets associated with a particular packet stream based, at least in part, on route characteristics (e.g., traffic, congestion, performance, etc.) associated with each of the packet routes. In another implementation, the routing unit 110 may select two or more packet routes for transmitting packets to the destination hybrid device 112 based, at least in part, on the packet stream associated with the packets to be transmitted. After the sequence indication unit 108 inserts the secondary sequence identifiers in the packets scheduled to be transmitted, the routing unit 110 can transmit the packets to the destination hybrid device 112 via the selected packet routes (e.g., by alternating the transmission of the packets between the two or more selected packet routes). The destination hybrid device 112 can receive the packets and can execute operations described below in stages B-D to re-order received packets (if necessary) based, at least in part, on the sequence identifiers.

At stage B, the re-ordering unit 116 of the destination hybrid device 112 detects out-of-order delivery of one or more of the plurality of packets associated with the packet stream received from the source hybrid device via the two or more packet routes based, at least in part, on the sequence identifiers associated with the plurality of received packets. In response to receiving the plurality of packets from the source hybrid device 102 via the two or more packet routes, the re-ordering unit 116 can read the sequence identifier associated with each received packet. In some implementations, the re-ordering unit 116 can compare the sequence identifier associated with the received packet with the sequence identifiers associated with one or more previously received packets associated with the same packet stream (e.g., the sequence identifier associated with the last received packet). Accordingly, the re-ordering unit 116 can determine whether the received packet is out-of-order with respect to the previously received packets and whether re-ordering operations should be executed. For example, for a particular packet stream, the re-ordering unit 116 may receive a packet with sequence number "5" after receiving a packet with sequence number "7." Consequently, the re-ordering unit 116 may determine that the received packet (with sequence number 5) is not in sequence with the previously received packets.

At stage C, the re-ordering unit 116 re-orders at least a subset of the plurality of packets based on the sequence identifiers associated with the plurality of packets in response to detecting out-of-order delivery of one or more of the plurality of packets associated with the packet stream received via the two or more packet routes. In some implementations, for each received packet that is not in sequence with the previously received packets of the same packet stream, the re-ordering unit 116 stores the received packet in the re-ordering buffer 118 until it can re-establish the correct order based on the sequence numbers. The re-ordering unit 116 can execute any suitable re-ordering techniques to re-order the received packet and one or more the previously received packets in the re-ordering buffer 118. It is noted that in some implementations, as will be further described in FIGS. 4-5, in response to determining that the received packet is not in sequence with the previously received packets, the re-ordering unit 116 may determine whether the packet was received after subsequent packets in the sequence were provided for processing by the upper protocol layers. If so, the re-ordering unit 116 may discard the received packet. Otherwise, the re-ordering unit 116 may store the packet in the re-ordering buffer 118 and may re-order the packets in the re-ordering buffer 118.

At stage D, the re-ordering unit 116 releases each of the received packets stored in the re-ordering buffer 118 in response to determining to provide the received packets(s) for subsequent processing. As will be further described in FIG. 5, the re-ordering unit 116 can provide one or more packets for subsequent processing by the upper protocol layers in response to determining that the one or more packets are in sequence in the re-ordering buffer 118, after a predetermined time interval, or when the re-ordering buffer 118 reaches a threshold capacity.

Figure 3:
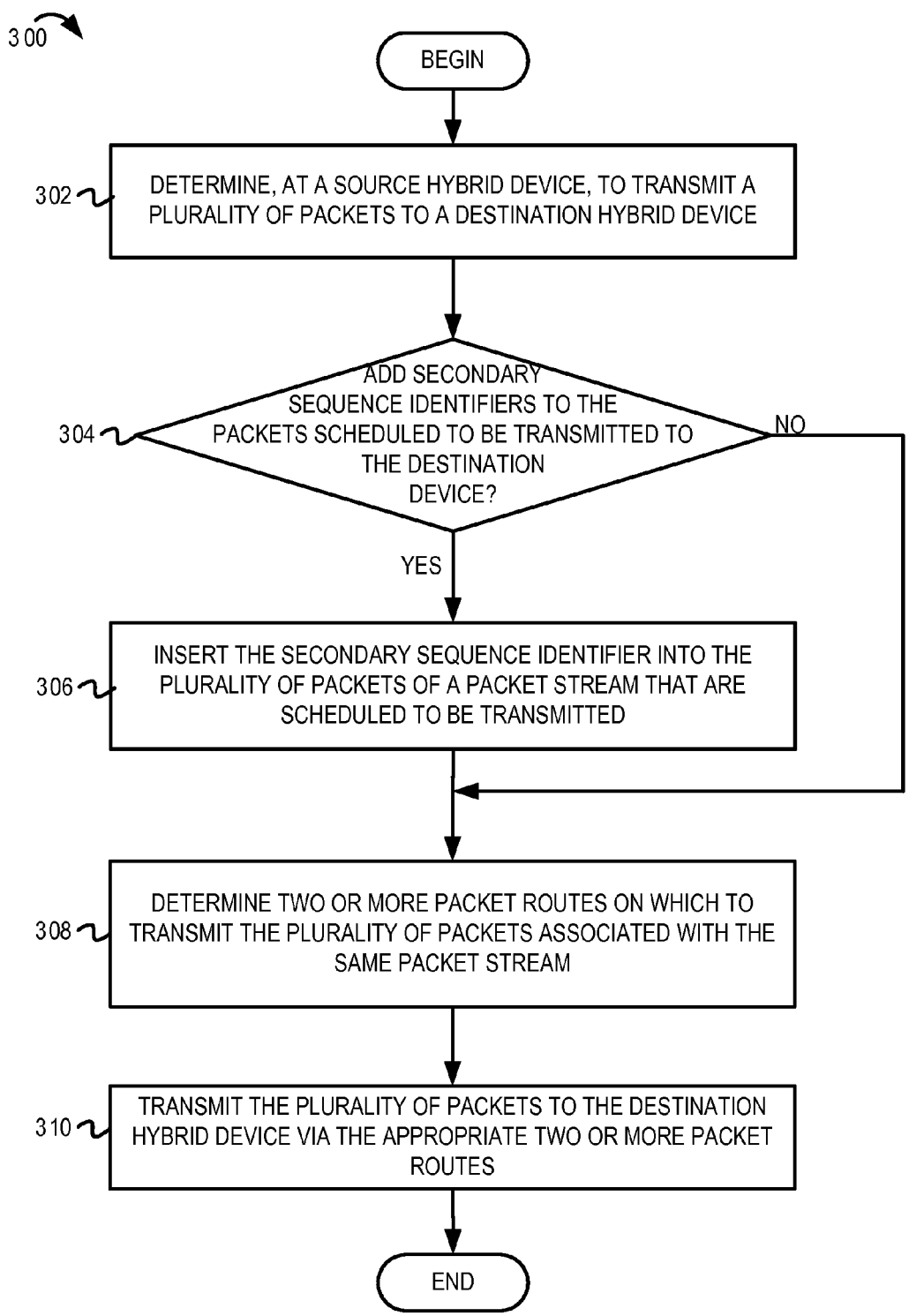
FIG. 3 is a flow diagram illustrating example operations for indicating a transmission order associated with packets transmitted from a source hybrid device to a destination hybrid device.

FIG. 3 is a flow diagram ("flow") 300 illustrating example operations for indicating a transmission order associated with packets transmitted from a source hybrid device to a destination hybrid device. The flow 300 begins at block 302 in FIG. 3.

At block 302, a source hybrid device determines to transmit a plurality of packets to a destination hybrid device. With reference to the example of FIG. 1, the source hybrid device 102 can determine to transmit the plurality of packets to the destination hybrid device 112. The flow continues at block 304.

At block 304, it is determined whether to add secondary sequence identifiers to the plurality of packets scheduled to be transmitted to the destination hybrid device. As described above, in some implementations, the upper protocol layers (e.g., the transport protocol layer 214) of the source hybrid device 102 may insert primary sequence identifiers in each of the plurality of packets scheduled to be transmitted to the destination hybrid device 112, before providing the packets to the hybrid adaptation layer 210. At block 304, the sequence indication unit 108 of the hybrid adaptation layer 210 can determine whether to insert secondary sequence identifiers associated in each of the plurality of packets. In some implementations, the sequence indication unit 108 can determine whether the packets already include primary sequence identifiers (previously inserted by the upper protocol layers). For example, if the source hybrid device 102 implements TCP, the TCP transport layer 214 may insert a 32-byte primary sequence number in the packets. If the sequence indication unit 108 determines that the packets comprise the primary sequence identifiers, the sequence indication unit 108 may determine not to insert the secondary sequence identifiers in the packets. As another example, if the source hybrid device 102 implements UDP, the UDP transport layer 214 may not insert primary sequence identifiers in the packets. If the sequence indication unit 108 determines that the plurality of packets do not comprise the primary sequence identifiers, the sequence indication unit 108 can determine to insert the secondary sequence identifiers in the packets.

In some embodiments, the sequence indication unit 108 can use any suitable classification techniques to determine the packet stream(s) associated with the plurality of packets scheduled to be transmitted, and accordingly, to determine whether to insert sequence identifiers in the packets, what type of sequence identifier to insert in the packets, and the value of the sequence identifier that should be inserted in the packets. For example, based on analyzing the plurality of packets scheduled for transmission, the sequence indication unit 108 may determine that a subset of the packets scheduled to be transmitted are part of a first packet stream (e.g., generated by a first application) and that the remaining packets are part of a second packet stream (e.g., generated by a second application). The sequence indication unit 108 may also determine that the first application uses TCP (which inserts primary sequence identifiers) and that the second application uses UDP (which does not insert primary sequence identifiers). Accordingly, the sequence indication unit 108 may determine not to add the secondary sequence identifiers to the packets that are part of the first packet stream and may determine to add the secondary sequence identifiers to the packets that are part of the second packet stream. If it is determined to add the secondary sequence identifier to the packets, the flow continues at block 306. Otherwise, if it is determined to not add the secondary sequence identifier to the packets, the source hybrid device 102 can rely on the destination hybrid device 112 to use the primary sequence identifiers to detect out-of-order packet delivery and to re-order the out-of-order packets and the flow continues at block 308.

At block 306, the source hybrid device inserts the secondary sequence identifier into the plurality of packets of a packet stream that are scheduled to be transmitted to the destination hybrid device. In some implementations, the sequence indication unit 108 can insert an appropriate secondary sequence number in each of the packets associated with a packet stream. The sequence indication unit 108 can increment (for each packet to be transmitted) a sequence number field of the packet by "1," by the number of bytes contained in the packet, or by another suitable increment value. In another implementation, the sequence indication unit 108 can insert an appropriate secondary timestamp in each of the packets associated with a packet stream (or both a timestamp and a sequence number). The sequence indication unit 108 can employ various techniques to insert the secondary sequence identifier in the packets scheduled to be transmitted. For example, the sequence indication unit 108 can insert the secondary sequence identifiers into the packets using special virtual local area network (VLAN) tag encodings reserved for indicating the packet order, a new tag based on a predetermined EtherType value, spare/unused packet fields in the packet header, new packet fields in the packet header, or other suitable techniques. Specifically, VLAN tags can be used to insert the secondary sequence identifiers, VLAN tags may be used to encode the secondary sequence identifiers, special reserved encodings may be used to encode the secondary sequence identifiers along with other information (e.g., VLAN identifiers or stream identification information).

In some implementations, the sequence indication unit 108 can periodically transmit (e.g., in a separate sequence list packet) an indication of packet signatures or other packet classification information and the order in which the packets will be transmitted by the source hybrid device 102. In one example, the sequence list packet can comprise a packet signature and a corresponding secondary sequence identifier associated with a plurality of packets (e.g., a predetermined number of packets of a packet stream) that are scheduled to be transmitted. In another example, the sequence list packet can comprise a packet signature and a corresponding primary sequence identifier associated with a plurality of packets (of a packet stream) that have already been transmitted. The sequence indication unit 108 can employ any suitable techniques to determine the packet signature. For example, a cyclic redundancy check (CRC) calculation method (or another suitable calculation method that is independent of the packet route) can be used to generate the packet signature (e.g., a CRC value). As will be further described below in FIGS. 4-5, the destination hybrid device 112 can use this sequence list packet to determine the correct order in which the packets should be organized and processed.

In some implementations, in addition to indicating the sequence in which the packets will be (or have been) transmitted, the sequence indication unit 108 can also transmit an indication of the packet stream associated with the packet (e.g., as part of the packet, in the sequence list packet, or in another distinct packet), The stream identification information associated with the packet can be added using special reserved VLAN tag encodings, a new tag based on a predetermined EtherType value, spare/reserved packet header fields, and/or new packet header fields in the packet. It is further noted that in some implementations, the sequence identifier associated with a first transmission of a packet and a subsequent retransmission of the packet may be the same and the sequence identifier may indicate the relative transmit sequence. The flow continues at block 308.

At block 308, two or more packet routes on which to transmit the plurality of packets associated with the same packet stream are determined. The flow 300 moves from block 306 to block 308 in response to the sequence indication unit 108 inserting the secondary sequence identifier into the packets. The flow 300 also moves from block 304 to block 308 in response to determining that the secondary sequence identifier should not be inserted in the packets (e.g., because the primary sequence identifiers are available). In some implementations, the routing unit 110 may switch between multiple packet routes for transmitting packets associated with a particular packet stream based, at least in part, on route characteristics (e.g., traffic, congestion, performance, etc.) associated with each of the packet routes. Transmitting packets associated with a single packet stream via multiple packet routes can increase aggregate throughput, lower delivery latency, and enable static or dynamic network link load balancing for efficient use of the available network resources. For example, the routing unit 110 may determine that the packet routes 124, 126, and 128 can be used to transmit packets associated with a first packet stream. The routing unit 110 may determine (e.g., based on analyzing the route characteristics) to transmit $\frac{1}{5}^{th}$ of the packets associated with the packet stream via the packet route 124, another $\frac{1}{5}^{th}$ of the packets associated with the packet stream via the packet route 128, and the remaining $\frac{3}{5}^{th}$ of the packets associated with the packet stream via the packet route 126. In other words, on determining to transmit 5 packets of a packet stream to the destination hybrid device 112, the routing unit 110 can transmit a first packet via the packet route 124, a second packet via the packet route 128, and the remaining 3 packets via the packet route 126. As another example, the routing unit 110 may alternate on a packet-by-packet basis between using the packet route 126 and the packet route 128. In other words, the routing unit 110 may transmit packets "n", "n+2", etc., in sequence along the packet route 126 and may transmit packets "n+1", "n+3", etc., along the packet route 128 to obtain the highest throughput for the packet stream. As described above, if the delivery latency associated with the packet route 128 is greater than the delivery latency associated with the packet route 126, packets transmitted earlier in time along the packet route 128 may arrive later than packets transmitted along the packet route 126, resulting in out-of-order packet arrival at the destination hybrid device 112. The flow continues at block 310.

At block 310, the plurality of packets are transmitted to the destination hybrid device via the two or more packet routes. For example, routing unit 110 can transmit (or can cause a transmission unit to transmit) the plurality of packets to the destination hybrid device 112 on the appropriate packet route selected at block 308. From block 310, the flow ends. In response to receiving the plurality of packets associated with the same packet stream, the destination hybrid device can re-order the packets (if necessary) based on the sequence identifiers, as will be described below in FIGS. 4-5.

Although FIG. 3 describes the sequence indication unit 108 determining whether to insert the secondary sequence identifiers into the packets based on whether the packets comprise the primary sequence identifiers, embodiments are not so limited. In other embodiments, the sequence indication unit 108 can insert the secondary sequence identifiers into the packets irrespective of whether the packets comprise the primary sequence identifiers. This can simplify operations for indicating the packet order at the source hybrid device 102 and for re-ordering the packets at the destination hybrid device 112.

Figure 4:
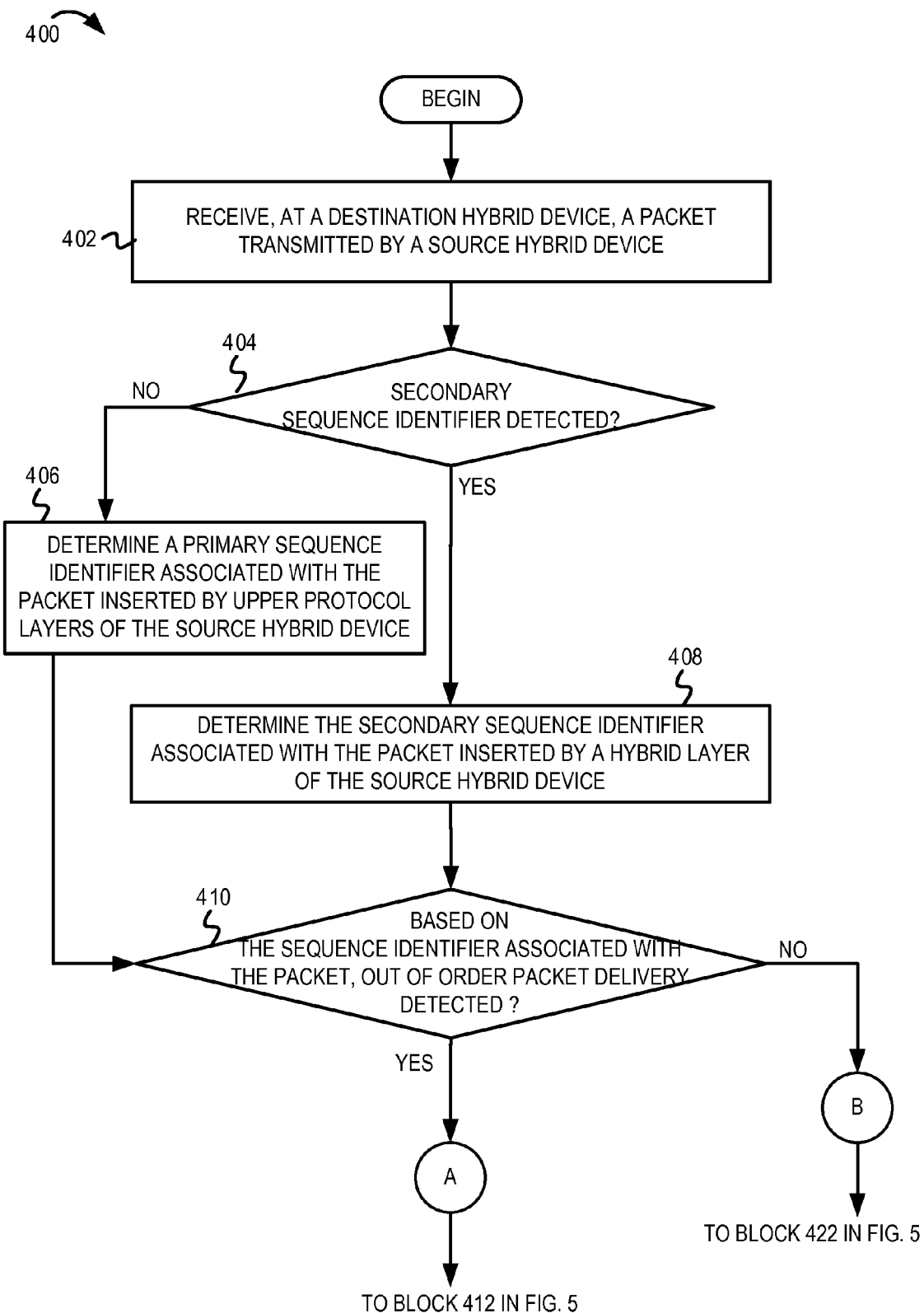
FIG. 4 is a flow diagram illustrating example operations for detecting and re-ordering out-of-order packets at a destination hybrid device.
Figure 5:
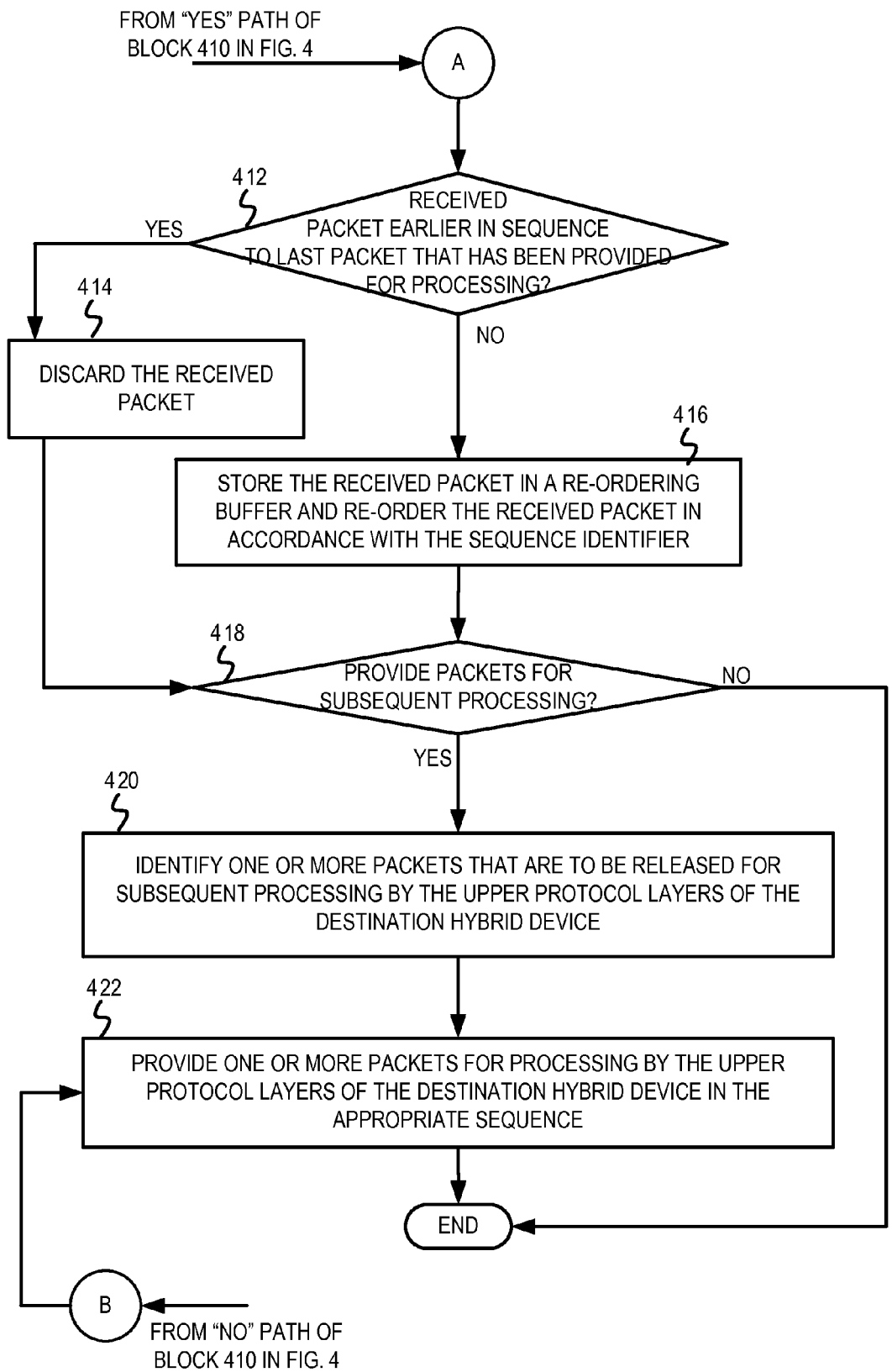
FIG. 5 is a continuation of FIG. 4 and also depicts example operations for detecting and re-ordering out-of-order packets at a destination hybrid device.

FIG. 4 and FIG. 5 depict flow diagram 400 illustrating example operations for detecting and re-ordering out-of-order packets at a destination hybrid device. The flow 400 begins at block 402 in FIG. 4.

At block 402, a destination hybrid device receives a packet transmitted by a source hybrid device. With reference to the example of FIG. 1, the re-ordering unit 116 of the destination hybrid device 112 can receive (from the source hybrid device 102) the packet associated with a packet stream along a packet route. In some implementations, the packet can be one of a plurality of packets associated with a packet stream that are transmitted via two or more packet routes from the source hybrid device 102 to the destination hybrid device 112. For example, a subset of the plurality of packets associated with the packet stream can be received via a first packet route and the remaining subset of the plurality of packets can be received via a second packet route. As another example, the source hybrid device 102 may alternate packet transmission on a packet-by-packet basis. The source hybrid device 102 may transmit a first of the plurality of packets associated with the packet stream via a first packet route, a second of the plurality of packets associated with the packet stream on a second packet route, a third of the plurality of packets associated with the packet stream via the first packet route, and so on. The flow continues at block 404.

At block 404, it is determined whether a secondary sequence identifier associated with the received packet is detected. For example, the re-ordering unit 116 can determine whether the received packet includes a secondary sequence identifier. As described above, in some implementations, the secondary sequence identifier is added to the packet by the hybrid adaptation layer 210 of the source hybrid device 102 and can comprise a sequence number, a timestamp, and/or other suitable sequence identifier associated with the packet. In some implementations, the re-ordering unit 116 can read one or more header fields associated with the received packet to determine whether the received packet comprises the secondary sequence identifier. The re-ordering unit 116 may also determine whether a sequence list packet (described above in FIG. 3) comprising a list of one or more secondary sequence identifiers associated with corresponding one or more packets was received from the source hybrid device 102. If the sequence list packet was received, then at block 404, the re-ordering unit 116 can determine whether the secondary sequence identifier associated with the received packet can be identified from the sequence list packet. If the secondary routing sequence identifier associated with the received packet is detected, the flow continues at block 408. Otherwise, the flow continues at block 406.

At block 406, if a secondary sequence identifier is not detected, a primary sequence identifier associated with the packet inserted by upper protocol layers of the source hybrid device is detected. The flow 400 moves from block 404 to block 406 if the re-ordering unit 116 determines that the received packet does not comprise the secondary sequence identifier. In some implementations, one or more of the upper protocol layers (of the conventional protocol stack) of the source hybrid device 102—the network layer 212, the transport layer 214, the applications 216, 218, 220 may insert a primary sequence identifier in the packet scheduled to be transmitted. For example, if the source hybrid device 102 implements TCP, the TCP transport layer 212 can insert a primary sequence number in the packet scheduled to be transmitted. The re-ordering unit 116 can "snoop" header fields of the received packet and/or can employ other packet inspection mechanisms to determine the primary sequence identifier associated with the received packet. After the re-ordering unit 116 determines the primary sequence identifier associated with the received packet, the flow continues at block 410.

At block 408, a secondary sequence identifier associated with the packet inserted by a hybrid adaptation layer of the source hybrid device is determined. The flow 400 moves from block 404 to block 408 if the re-ordering unit 116 determines that the received packet comprises the secondary sequence identifier. As described above in FIG. 3, the hybrid adaptation layer 210 of the source hybrid device 102 can insert the secondary sequence identifier in the packet scheduled to be transmitted depending on the packet stream associated with the packet. In one implementation, the re-ordering unit 116 can read an appropriate header field of the received packet to determine the secondary sequence identifier associated with the received packet. In another implementation, the re-ordering unit 116 can use a previously received sequence list packet to determine the secondary sequence identifier associated with the received packet. In this implementation, the re-ordering unit 116 can calculate a packet signature (e.g., a CRC value), identify the packet signature from the sequence list packet, and read the secondary sequence identifier that corresponds to the identified packet signature in the sequence list packet. In another implementation, the re-ordering unit 116 can temporarily store the received packet in the re-ordering buffer 118, wait to receive the sequence list packet from the source hybrid device 102, and determine the secondary sequence identifier associated with the received packet in response to receiving the sequence list packet. After the re-ordering unit 116 determines the secondary sequence identifier associated with the received packet, the flow continues at block 410.

At block 410, based on the sequence identifier associated with the packet, it is determined whether out-of-order packet delivery is detected at the destination hybrid device. In some implementations, the receiver re-ordering unit 116 can sort the received packets into packet streams (e.g., based on one or more fields in the headers associated with the received packets, based on information in the sequence list packet, etc.). The re-ordering unit 116 can use packet classification techniques and/or information (e.g., inserted by the source hybrid device 102) in the packet headers to identify packets that belong to a particular packet stream. The re-ordering unit 116 can then determine the sequence identifier (e.g., the primary sequence identifier or the secondary sequence identifier) of one or more previously received packets that belongs to the same packet stream as the packet received at block 402. In some implementations, the re-ordering unit 116 can keep track of (e.g., in a predetermined memory location) the sequence identifier associated with the last received packet associated with the packet stream. In another implementation, in response to determining the sequence identifier associated with the received packet, the re-ordering unit 116 can examine the re-ordering buffer 118 and can determine the sequence identifiers associated with the packets stored in the re-ordering buffer 118. For example, the re-ordering unit 116 may determine that the sequence number of the received packet is 50. The re-ordering unit 116 may determine that the sequence number of the last received packet was 45. Accordingly, the re-ordering unit 116 can determine that the received packet was delivered to the destination hybrid device 112 out-of-order or not according to a predetermined order ("out-of-order packet delivery"). Alternately, if re-ordering unit 116 determines that the sequence number of the last received packet was 49, the re-ordering unit 116 can determine that out-of-order packet delivery was not detected. If the sequence identifier associated with the received packet is greater than the expected sequence number (based on the last packet in sequence received), out-of-order packet delivery is detected and the flow continues at block 412 in FIG. 5. Otherwise, the flow continues at block 422 in FIG. 5.

At block 412 in FIG. 5, it is determined whether the received packet is earlier in sequence to the last packet that has been provided for processing at the destination hybrid device 112. The flow 400 moves from block 410 in FIG. 4 to block 412 in FIG. 5 if the re-ordering unit 116 determines that out-of-order packet delivery was detected. At block 412, the re-ordering unit 116 can determine the sequence identifier associated with the last packet (that belongs to the same packet stream as the packet received at block 402) that was provided for processing by the upper protocol layers. The re-ordering unit 116 can then determine whether the sequence identifier of the received packet is less than the sequence identifier of the last packet that was provided for processing. For example, the re-ordering unit 116 may determine that the timestamp of the received packet is 16:20:00. The re-ordering unit 116 may also determine the range of timestamps associated with packets stored in the re-ordering buffer 118 and/or the timestamp of the last packet that was provided for processing. If the timestamp of the last packet that was provided for processing was 16:25:00 (i.e., greater than the timestamp of the currently received packet), the re-ordering unit 116 can then determine that the received packet is earlier in sequence to the last packet that was provided for processing at the destination hybrid device 112. Consequently, the flow continues at block 414. However, if the timestamp of the last packet that was provided for processing was 16:19:00 (i.e., less than the timestamp of the currently received packet), the re-ordering unit 116 can then determine that the received packet is later in sequence to the last packet that was provided for processing. Consequently, the flow continues at block 416.

At block 414, the received packet is discarded. The flow 400 moves from block 412 to block 414 if the re-ordering unit 116 determines, based on the sequence identifiers, that the received packet is earlier in sequence to the last packet that was provided for processing at the destination hybrid device 112. For example, the re-ordering unit 116 can determine not to provide the received packet to the upper protocol layers and can discard the packet if packets that are later in sequence to the received packet have already been provided for processing to the destination hybrid device 112. As another example, the re-ordering unit 116 can discard the packet if the packet was received after a predetermined time interval for receiving the packet elapsed. The flow continues at block 418.

At block 416, the received packet is stored in a re-ordering buffer and the received packet is re-ordered in accordance with the sequence identifier. The flow 400 moves from block 412 to block 416 if the re-ordering unit 116 determines that the received packet is later in sequence to the last packet that was provided for processing. The re-ordering unit 116 can store the received packet in the re-ordering buffer 118. In some implementations, the size of the re-ordering buffer 118 may be dynamically (or statically) configured based, at least in part, on the round-trip delay, multiple round-trip delays if the communication protocol employed by the source hybrid device 102 and the destination hybrid device 112 supports multiple re-transmission attempts, the largest acceptable delay between receiving a last packet in sequence and receiving an out-of-order packet, re-transmission delay, expected delays in the hybrid communication network 100, and other such factors. For example, if the maximum acceptable round-trip delay is 100 ms and the maximum length of each packet is 20 ms, the size of the re-ordering buffer 118 (e.g., the number of packets that can be stored in the re-ordering buffer 118) can be selected so that at least 4 out-of-order packets can be stored in the re-ordering buffer while waiting for the next packet in sequence to arrive at the destination hybrid device 112.

In one implementation, the re-ordering unit 116 can re-order the packets in the re-ordering buffer 118 based on the sequence identifiers so that packets associated with the same packet stream are delivered in sequence (or nearly in sequence) to the upper protocol layers and applications. For example, the re-ordering unit 116 may determine that the sequence number of the received packet is 50 and that the re-ordering buffer 118 comprises packets with sequence numbers 47, 48, 52, and 54. Accordingly, the re-ordering unit 116 can re-order the packets by inserting the received packet with sequence number 50 in between the packets with sequence identifiers 48 and 52. In another implementation, the re-ordering unit 116 may store the packets in the re-ordering buffer 118 in the order in which they were received and may update a list or a flag associated with each entry of the re-ordering buffer 118 to indicate the order in which the stored packets should be released for processing. With reference to the above example, where the re-ordering buffer 118 comprises packets with sequence numbers 47, 48, 52, and 54, the re-ordering unit 116 may assign tags of "P1," "P2," "P3," and "P4" respectively to indicate the order in which the packets should be released for processing. In response to receiving the packet with the sequence number 50, the re-ordering unit 116 can store the packet with the sequence number 50 after the packet with the sequence number 54. The re-ordering unit 116 can indicate the new packet order by updating the tags associated with the packets stored in the re-ordering buffer 118. In other words, the re-ordering unit 116 can assign tags "P1," "P2," "P3," "P4," and new tag "P5" to the packets with sequence numbers 47, 48, 50, 52, and 54 respectively. As will be described below in blocks 420-422, the re-ordering unit 116 can release the packets from the re-ordering buffer 118 to the upper protocol layers and applications at the destination hybrid device 112 such that the original packet order (established at the source hybrid device 102) is maintained. The flow continues at block 418.

At block 418, it is determined whether one or more packets should be provided for subsequent processing. For example, the re-ordering unit 116 can determine whether the packets from the re-ordering buffer 118 should be provided for subsequent processing to upper protocol layers of the destination hybrid device 112. As described above, in maintaining the re-ordering buffer 118, the re-ordering unit 116 can attempt to release (for subsequent processing) packets associated with a packet stream in the same order in which they were transmitted by the source hybrid device 102. In some implementations, the re-ordering unit 116 can determine to provide the packets in the re-ordering buffer 118 to the upper protocol layers in response to detecting two or more packets in the correct order. In another implementation, the re-ordering unit 116 can directly provide the received packet to the upper protocol layers (without storing in the re-ordering buffer 118) in response to detecting that the received packet is in sequence with the last packet that was provided to the upper protocol layers.

In some implementations, to guard against the destination hybrid device 112 waiting indefinitely to receive a dropped/discarded packet (or against excessive packet delivery delay), the re-ordering unit 116 can employ a time-out mechanism and can release packets from the re-ordering buffer 118 after a predetermined buffer time interval elapses. The predetermined buffer time interval may be determined based, at least in part, on the expected round-trip acknowledgement time, the re-transmission delay, and/or the maximum difference in delivery latency between packet routes that are used to deliver packets associated with a packet stream. For example, if the destination hybrid device 112 fails to receive a packet in sequence within the predetermined buffer time interval, then the re-ordering unit 116 may determine that packet transmission (or re-transmission) failed, that the packet will not be delivered, and may release packets from the re-ordering buffer 118 with greater sequence numbers than the failed packet. In another implementation, the re-ordering unit 116 can release the packets for subsequent processing when the re-ordering buffer 118 becomes full or exceeds a buffer threshold level. The buffer threshold level can be selected based on the maximum amount of data that may accumulate at the destination hybrid device 112, delivery latencies of the packet routes that are used to deliver packets associated with a packet stream, and other such factors. If it is determined that one or more packets should be provided for subsequent processing by the upper protocol layers, the flow continues at block 420. Otherwise, the flow ends.

At block 420, one or more packets that are to be released for subsequent processing by the upper protocol layers of the destination hybrid device are identified. The flow continues at block 422.

At block 422, one or more packets are provided for processing by the upper protocol layers of the destination hybrid device in the appropriate sequence. For example, the re-ordering unit 116 can provide the received packet and/or one or more packets from the re-ordering buffer 118 for processing by the upper protocol layers of destination hybrid device 112 in the appropriate sequence. In some implementations, the sequence of packets released to the upper protocol layers may be in-order, but the sequence may not include one or more packets if the missing packets were not received (e.g., during the predetermined buffer time interval) or were discarded. For example, if the packet with sequence number 5 was not received during the predetermined buffer time interval or before the buffer reached its threshold capacity, the packets from the re-ordering buffer 118 may be provided to the upper protocol layers in the order 1, 2, 3, 4, 6, 7, etc. From block 422, the flow ends.

It is noted that although FIG. 4 describes the re-ordering unit 116 determining (at block 404) whether the received packet comprises the secondary sequence identifier, embodiments are not so limited. In some embodiments, as described above, the source hybrid device 102 may be configured to insert the secondary sequence identifier into the packet irrespective of whether the packet comprises the primary sequence identifier. In this embodiment, the destination hybrid device 112 can be configured to use the use the secondary sequence identifier to detect and re-order the out-oforder packets irrespective of whether the packet comprises the primary sequence identifier. In another embodiment, the destination hybrid device 112 may determine whether to use the primary sequence identifier or the secondary sequence identifier to detect and re-order the out-of-order packets.

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. Although FIG. 5 describes the destination hybrid device 112 re-ordering packets in response to detecting an out-of-order packet delivery, embodiments are not so limited. In some embodiments, depending on the communication protocol implemented by the source and destination hybrid devices, the application that receives the packets, etc., in-order packet delivery to upper protocol layers may not be required at the destination hybrid device 112. In some implementations, prior to determining whether out-of-order packet delivery was detected at the destination hybrid device 112 (at block 410 of FIG. 4), it may be determined whether delivering packets in order to the upper protocol layers of the destination hybrid device 112 is necessary or useful. For example, the re-ordering unit 116 of the hybrid adaptation layer 210 may not execute the operations described above in FIGS. 4-5 if it is determined that re-ordering mechanisms built into the upper protocol layers (e.g., the TCP of the IPv4 protocol suite) are sufficient to handle out-of-order packet delivery. As another example, packet re-ordering mechanisms as described in FIGS. 4-5 may be executed if it is determined that the upper protocol layers do not comprise functionality (or comprise very limited functionality) for re-ordering the out-of-order packets.

In some implementations, the source hybrid device 102 may be configured to wait for an acknowledgement (e.g., from the destination hybrid device 112) to the packets transmitted on a first packet route (e.g., the packet route 124) before switching to a second packet route (e.g., the packet route 126). The source hybrid device 102 may retransmit the packets on the first packet route 124 until the acknowledgement is received or until a predetermined time interval elapses. The source hybrid device 102 may not transmit a packet via the second packet route 126 until the packets transmitted on the first packet route 124 have been acknowledged. In other implementations, however, the source hybrid device 102 may not wait for an acknowledgement from the destination hybrid device 112. Instead, the source hybrid device 102 may transmit a packet via the second packet route 126 after transmitting the last packet via the first packet route 124 without waiting for an acknowledgement. For example, if the source hybrid device 102 switches between the packet route for every packet (or every other packet), the source hybrid device 102 may not wait for an acknowledgement from the destination hybrid device 112. Alternately, in some implementations, the source hybrid device 102 may transmit unacknowledged packets of the first packet route 124 via the second packet route 126.

In some implementations, the source hybrid device 102 can duplicate packets transmitted via a designated packet route (e.g., the packet route 124) on one or more alternate packet routes route (e.g., the packet route 126). The effect of degradation in the delivery characteristics (e.g., throughput, latency, error rate, reliability, etc.) associated with a packet route may be reduced by configuring the source hybrid device 102 to transmit one or more duplicate packets. In one example, the routing unit 110 can duplicate a packet by transmitting a copy of the same packet along the two or more packet routes that are used to transmit packets associated with a packet stream (e.g., via both the packet route 124 and the packet route 126) to improve the probability that the packet is successfully delivered to the destination hybrid device 112 and/or to reduce packet delivery latency. In some implementations, the routing unit 110 may determine to re-transmit (on another packet route 126) a predetermined number of packets previously transmitted via one of the packet routes 124. In another implementation, the routing unit 110 may determine to duplicate packets transmitted along certain packet routes between the source hybrid device 102 and the destination hybrid device 112. For example, the routing unit 110 may only duplicate packets that are transmitted via the packet route 124. The routing unit 110 may determine not to duplicate the packets that are transmitted via the packet routes 126 and 128. In another implementation, the routing unit 110 may determine to re-transmit packets on another packet route 126 if the packets transmitted via the packet route 124 were not acknowledged by the destination hybrid device 112. For example, the routing unit 110 may determine that an acknowledgement for a packet transmitted via the packet route 124 was not received within a predetermined acknowledgement time interval. Accordingly, the routing unit 110 may re-transmit the packet to the destination hybrid device 112 via another packet route 126.

At the destination hybrid device 112, the re-ordering unit 116 can detect duplicate packets using the sequence identifiers inserted in the packets by the sequence indication unit 108 (or the upper protocol layers) of the source hybrid device 102. For example, if the duplicate packets are assigned the same sequence identifier as the original packet, receiving multiple packets with the same sequence identifier can indicate the presence of duplicate packets. In another implementation, the re-ordering unit 116 can detect duplicate packets based on packet signatures. For example, if the re-ordering unit 116 detects two packets with the same packet signature, this can indicate that the two detected packets are duplicates of each other. The re-ordering unit 116 can maintain a record of the packet signatures associated with recently received packets and can use this record of received packet signatures to detect duplicate packets. The re-ordering unit 116 can then discard the duplicate packets.

Although not depicted in FIGS. 1-5, it is noted that in some implementations the source hybrid device 102 can employ time delay techniques to maintain proper packet order at the destination hybrid device 112. With reference to the example of FIG. 1, the routing unit 110 may employ multiple packet routes to transmit packets based, at least in part, on the packet stream associated with the packets scheduled to be transmitted, route characteristics, etc. In some implementations, after transmitting the last packet along a first packet route 124, the transmitter processing unit 106 can wait (and prevent packet transmission) for a predetermined wait time interval to ensure that all the packets transmitted via the first packet route 124 arrive at the destination hybrid device 112 before packets the change in the packet route. The predetermined wait time interval can be the time duration between transmission of a last packet via the first packet route 124 and transmission of a first packet via the next packet route 126 during which the source hybrid device 102 may not transmit any packets to the destination hybrid device 112. For example, in response to determining to alternate transmission of packets associated with a packet stream on the packet routes 124 and 126, the routing unit 110 can transmit the first packet on the packet route 124, wait for the predetermined time interval, transmit the second packet on the packet route 126, wait for the predetermined time interval, transmit the third packet on the packet route 124, and so on. The predetermined wait time interval can be dynamically (or statically) configured based on the estimated time that may be required for a packet associated with a particular stream to be delivered through the hybrid communication network 100 via a current packet route 124, the maximum time interval within which an upper protocol layer acknowledgement packet may be received from the destination hybrid device 112, current packet route delays, latency associated with the hybrid communication network 100, latency associated with the packet routes assigned to transmit packets associated with a packet stream, the largest delay between receiving a last packet in sequence and receiving an out-of-order packet, re-transmission delay, the size of the re-ordering buffer 118, and/or other such factors. In some implementations, the predetermined wait time interval may be determined based, at least in part, on multiple round-trip delays if the communication protocol employed by the source hybrid device 102 and the destination hybrid device 112 support multiple re-transmission attempts. In some implementations, the destination hybrid device 112 may detect the predetermined wait time delay and can determine the change in the packet route associated with the packet stream. In other implementations, the destination hybrid device 112 may not explicitly detect the predetermined wait time delay or the change in the packet route. By enforcing the predetermined wait time delay between changes in the packet route used for transmitting packets associated with the packet stream, the source hybrid device 102 can try to ensure that packets transmitted from the source hybrid device 102 are received in the correct order at the destination hybrid device 112. Furthermore, it is noted that in some implementations, the source hybrid device 102 can determine whether to use the time delay mechanism described above based on the processing capabilities of the destination hybrid device 112. For example, the source hybrid device 102 can determine to use the time delay mechanism to enable ordered packet reception at the destination hybrid device 112, if the destination hybrid device 112 is not configured to detect the sequence identifiers and/or if the destination device 110 is not configured to reorder out-of-order packets.

In some embodiments, the time delay mechanism and the transmission of secondary sequence identifiers may be mutually exclusive operations. However, in other embodiments, the source hybrid device 102 can enforce the predetermined wait time delay (as described above) in addition to transmitting the secondary sequence identifiers associated with the packets. In other embodiments, the source hybrid device 102 can enforce the predetermined wait time delay but may not implement the secondary sequence identifiers if the packets comprise the primary sequence identifiers. In some implementations, the source hybrid device 102 can enforce the predetermined wait time delay and implement the secondary sequence identifiers even if the packets comprise the primary sequence identifiers.

Although FIG. 5 describes operations for discarding missing packets if the missing packets are received after the predetermined buffer time interval elapses and/or if packets that are later in sequence to the received missing packets have already been released to the upper protocol layers. In some implementations, the re-ordering unit 116 can provide all the received packets to the upper protocol layers irrespective of whether the received packets are earlier/later in sequence to the packets that have already been provided to the upper protocol layers. In this implementation, the re-ordering unit 116 may only discard duplicate packets that have already been provided to the upper protocol layers. In other implementations, however, the re-ordering unit 116 can explicitly detect re-transmitted packets by observing acknowledgement packets, and/or by inferring re-transmission by arrival timing (e.g., excessively delayed frames may be assumed to be re-transmissions), arrival interface, headers that indicate packet re-transmission, or other packet header fields. The re-ordering unit 116 may only provide the re-transmitted packets for subsequent processing irrespective of whether packets that are later in sequence have been provided to the upper protocol layers. Lastly, it is noted that the sequence indication unit 108, the routing unit 110, the re-ordering unit 116, and the re-ordering buffer 118 may be separate from and in addition to any conventional, upper layer re-ordering mechanism implemented in the conventional protocol stack (e.g., the transport layer 214, etc.).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
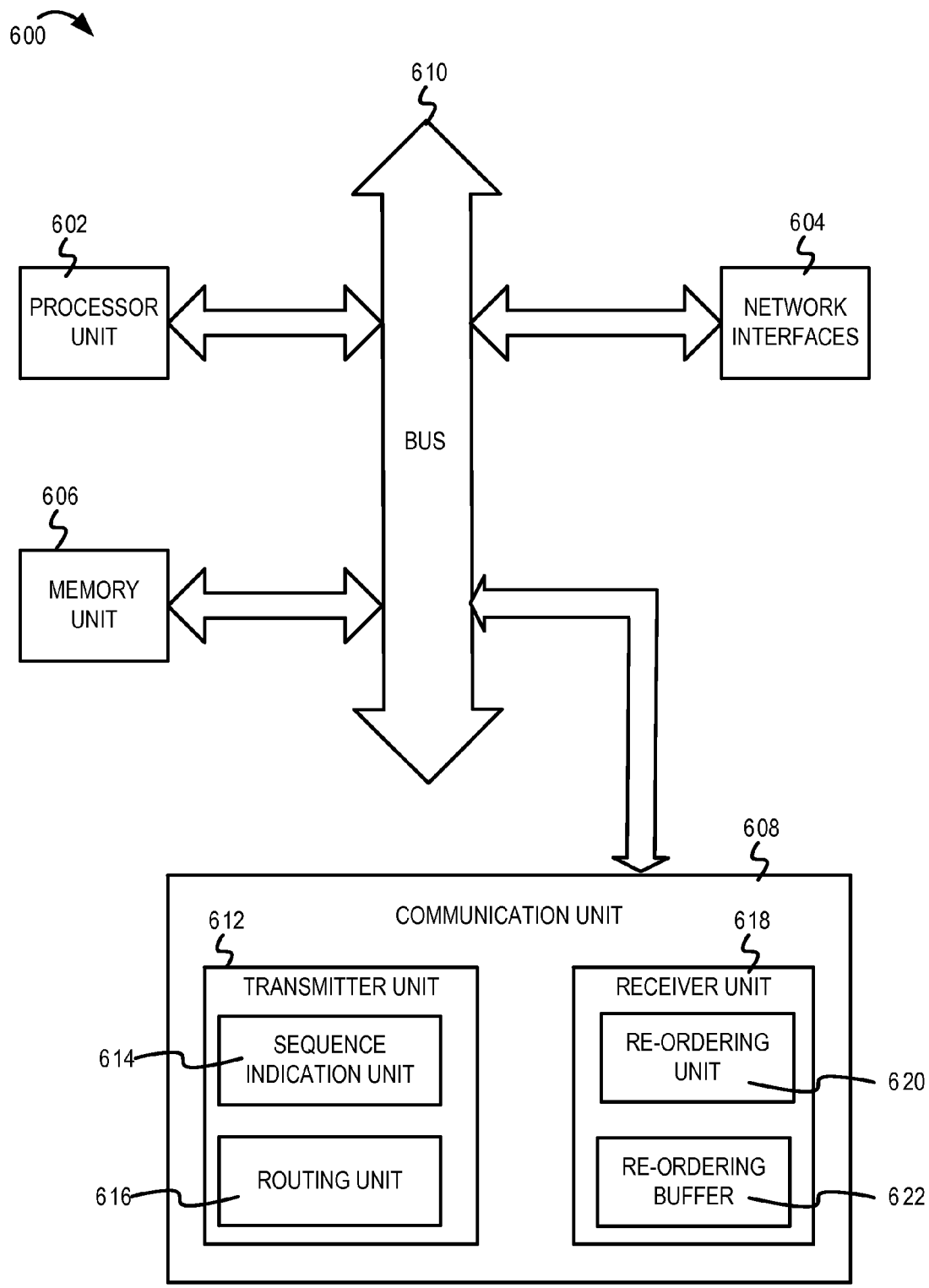
FIG. 6 is a block diagram of one embodiment of an electronic device including a mechanism for packet re-ordering in a hybrid communication network.

FIG. 6 is a block diagram of one embodiment of an electronic device 600 including a mechanism for packet re-ordering based on sequence identifiers associated packets in a hybrid communication network. In some implementations, the electronic device 600 may be one of a laptop computer, a tablet computer, a netbook, a mobile phone, a smart appliance, a powerline communication device, a gaming console, network bridging devices, or other electronic systems comprising a hybrid communication unit configured to communicate across multiple communication network segments. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, Infini-Band®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 600 can comprise a plurality of network interfaces—each of which couples the electronic device 600 to a different communication network segment. For example, the electronic device 600 can comprise a powerline communication interface, an Ethernet interface, and a WLAN interface that couple the electronic device 600 with a powerline communication network segment, Ethernet, and a wireless local area network respectively.

The electronic device 600 also includes a communication unit 608. The communication unit 608 comprises a transmitter unit 612 and a receiver unit 618. The transmitter unit 612 comprises a sequence indication unit 614 and a routing unit 616. The receiver unit 618 comprises a re-ordering unit 620 and a re-ordering buffer 622. In some instances, the electronic device 600 can operate as a source device that transmits one or more packets to a destination device. In these instances, the sequence indication unit 614 can determine and insert (if necessary) secondary sequence identifiers for a plurality of packets associated with a packet stream that are scheduled to be transmitted along two or more packet routes. The routing unit 616 can identify the two or more packet routes on which the packets should be transmitted and can accordingly transmit the packets, as described above in FIGS. 1-3. In other instances, the electronic device 600 can operate as a destination device that receives a plurality of packets associated with a packet stream from a source device via two or more packet routes. In these instances, the re-ordering unit 620 can implement functionality to detect out-of-order packet delivery based on the sequence identifiers, re-order the received packets (e.g., using the re-ordering buffer 622), and provide the packets for subsequent processing, as described above in FIGS. 1, 4, and 5. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602

While the embodiments are described with reference to various implementations and exploitations, it will be understood that these embodiments are illustrative and that the scope of the inventive subject matter is not limited to them. In general, techniques for multiple delivery route packet ordering as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first network device, primary and secondary sequence identifiers associated with a plurality of packets received from a second network device via a plurality of packet routes, wherein a first subset of the plurality of packets are received via a first packet route and a second subset of the plurality of packets are received via a second packet route;
   detecting out-of-order delivery of a first packet with respect to a second packet based, at least in part, on the secondary sequence identifier of the first packet and the secondary sequence identifier of the second packet; and
   re-ordering the first packet and the second packet based, at least in part, on the secondary sequence identifier of the first packet and the secondary sequence identifier of the second packet in response to said detecting out-of-order delivery of the first packet with respect to the second packet.

2. The method of claim 1, further comprising:
   receiving, at the first network device, a sequence list packet from the second network device that indicates an order in which the second network device will transmit the plurality of packets to the first network device.

3. The method of claim 1, wherein said determining the primary and secondary sequence identifiers associated with the plurality of packets further comprises:
   reading the secondary sequence identifier of the first packet from a header field of the first packet.

4. The method of claim 1, wherein said determining the primary secondary sequence identifiers associated with the plurality of packets further comprises:
   determining a packet signature of the first packet based, at least in part, on at least one of a header field of the first packet and a payload of the first packet;
   comparing the packet signature of the first packet with a plurality of packet signatures in a sequence list packet, wherein the sequence list packet includes a packet signature and a corresponding secondary sequence identifier for each of the plurality of packets, wherein the sequence list packet is provided from the second network device to the first network device;
determining that the packet signature of the first packet matches a first packet signature; and
selecting, from the sequence list packet, a first secondary sequence identifier that corresponds to the first packet signature as the secondary sequence identifier of the first packet.

5. The method of claim 1, wherein the secondary sequence identifier is indicated in at least one bit of a virtual local area network (VLAN) tag of the first packet, wherein the at least one bit of the VLAN tag that indicates the secondary sequence identifier is associated with a predetermined encoding.

6. The method of claim 1, wherein said detecting out-of-order delivery of the first packet with respect to the second packet further comprises:
determining whether the secondary sequence identifier of the first packet is in sequence with a secondary sequence identifier of a previously received packet;
determining that the first packet is in order with the previously received packet in response to determining that the secondary sequence identifier of the first packet is in sequence with the secondary sequence identifier of the previously received packet; and
determining that the first packet is out-of-order with reference to the previously received packet in response to determining that the secondary sequence identifier of the first packet is not in sequence with the secondary sequence identifier of the previously received packet.

7. The method of claim 1, wherein:
said detecting out-of-order delivery of the first packet with respect to the second packet further comprises storing the first packet in a re-ordering buffer; and
said re-ordering the first packet and the second packet further comprises re-ordering the second packet with the first packet previously stored in the re-ordering buffer.

8. The method of claim 1, wherein said detecting out-of-order delivery of the first packet with respect to the second packet further comprises:
determining, based on the secondary sequence identifier of the first packet, whether the first packet is earlier in sequence to a last packet of the plurality of packets that was provided for processing to upper protocol layers of the first network device;
discarding the first packet at the first network device in response to determining that the first packet is earlier in sequence to the last packet that was provided for processing to the upper protocol layers; and
re-ordering the first packet based on the secondary sequence identifier of the first packet in response to determining that the first packet is later in sequence to the last packet that was provided for processing to the upper protocol layers.

9. The method of claim 1, wherein the secondary sequence identifier of the first packet comprises at least one of a sequence number of the first packet and a timestamp of the first packet.

10. The method of claim 1, wherein, in response to said re-ordering the first packet and the second packet, the method further comprises:
providing the first packet and the second packet for processing to upper protocol layers of the first network device.

11. The method of claim 1, wherein said detecting out-of-order delivery of the first packet with respect to the second packet comprises:
determining, at the first network device, that the first packet and a third packet have same secondary sequence identifiers;
in response to determining that the first packet and the third packet have the same secondary sequence identifiers, providing the first packet for said re-ordering the first packet and the second packet; and
discarding the third packet.

12. The method of claim 1, wherein:
the primary sequence identifier of the first packet is inserted by upper protocol layers of the second network device,
the secondary sequence identifier of the first packet is inserted by a hybrid adaptation layer of the second network device, and
the hybrid adaptation layer is an intermediate protocol layer between the upper protocol layers and a plurality of network interfaces of the second network device.

13. A method comprising:
determining, at a first network device, to transmit a plurality of packets to a second network device via a plurality of packet routes between the first network device and the second network device;
inserting a secondary sequence identifier into each of the plurality of packets, wherein the secondary sequence identifier is inserted by a hybrid adaptation layer of the first network device; and
transmitting the plurality of packets to the second network device via the plurality of packet routes, wherein a first subset of the plurality of packets including corresponding secondary sequence identifiers are transmitted via a first packet route and a second subset of the plurality of packets including corresponding secondary sequence identifiers are transmitted via a second packet route.

14. The method of claim 13, wherein said inserting the secondary sequence identifier comprises:
inserting the secondary sequence identifier in addition to a primary sequence identifier inserted by an upper protocol layer of the first network device into each of the plurality of packets; or
inserting the secondary sequence identifier into each of the plurality of packets in response to determining that the plurality of packets do not include the primary sequence identifier.

15. The method of claim 13, wherein said inserting the secondary sequence identifier further comprises:
inserting the secondary sequence identifier into a header field of a first packet; and
transmitting the first packet including the secondary sequence identifier to the second network device.

16. The method of claim 13, wherein said inserting the secondary sequence identifier further comprises:
for each of the plurality of packets, determining a packet signature that uniquely identifies the packet based on at least one of a header field of the packet and a payload of the packet; and
generating a sequence list packet that includes the packet signature and a corresponding secondary sequence identifier of each of the plurality of packets.

17. The method of claim 16, further comprising:
transmitting the sequence list packet to the second network device to indicate a packet order in which the plurality of packets will be transmitted from the first network device to the second network device; and
transmitting the plurality of packets to the second network device in accordance with the packet order indicated in the sequence list packet.

18. The method of claim 13, further comprising:
determining, at the first network device, to transmit a first packet via the first packet route instead of the second packet route;
transmitting a second packet via the second packet route, wherein the second packet is a last packet that will be transmitted via the second packet route;
preventing transmission of subsequent packets of the plurality of packets via the second packet route and the first packet route for a predetermined time interval in response to said transmitting the second packet via the second packet route; and
transmitting the first packet via the first packet route after the predetermined time interval elapses.

19. A first communication network device comprising:
a network interface; and
a re-ordering unit coupled with the network interface, the re-ordering unit operable to:
determine primary and secondary sequence identifiers associated with a plurality of packets received from a second communication network device via a plurality of packet routes between the first communication network device and the second communication network device, wherein a first subset of the plurality of packets are received via a first packet route and a second subset of the plurality of packets are received via a second packet route;
detect out-of-order delivery of a first packet of the plurality of packets with respect to a second packet based, at least in part, on the secondary sequence identifier of the first packet and the secondary sequence identifier of the second packet; and
re-order the first packet and the second packet based, at least in part, on the secondary sequence identifier of the first packet and the secondary sequence identifier of the second packet in response to the re-ordering unit detecting out-of-order delivery of the first packet with respect to the second packet.

20. The first communication network device of claim 19, wherein the re-ordering unit is further operable to:
receive a sequence list packet from the second communication network device that indicates an order in which the second communication network device will transmit the plurality of packets to the first communication network device.

21. The first communication network device of claim 19, wherein the re-ordering unit operable to determine the primary and secondary sequence identifiers associated with the plurality of packets further comprises the re-ordering unit operable to:
read the secondary sequence identifier of the first packet from a header field of the first packet.

22. The first communication network device of claim 19, wherein the re-ordering unit operable to determine the primary and secondary sequence identifiers associated with the plurality of packets further comprises the re-ordering unit operable to:
determine a packet signature of the first packet based, at least in part, on at least one of a header field of the first packet and a payload of the first packet;
compare the packet signature of the first packet with a plurality of packet signatures in a sequence list packet, wherein the sequence list packet includes a packet signature and a corresponding secondary sequence identifier for each of the plurality of packets, wherein the sequence list packet is provided from the second communication network device to the first communication network device;
determine that the packet signature of the first packet matches a first packet signature; and
select, from the sequence list packet, a first secondary sequence identifier that corresponds to the first packet signature as the secondary sequence identifier of the first packet.

23. The first communication network device of claim 19, wherein the re-ordering unit operable to detect out-of-order delivery of the first packet with respect to the second packet further comprises the re-ordering unit operable to:
determine whether the secondary sequence identifier of the first packet is in sequence with a secondary sequence identifier of a previously received packet;
determine that the first packet is in order with the previously received packet in response to the re-ordering unit determining that the secondary sequence identifier of the first packet is in sequence with the secondary sequence identifier of the previously received packet; and
determining that the first packet is out-of-order with reference to the previously received packet in response to the re-ordering unit determining that the secondary sequence identifier of the first packet is not in sequence with the secondary sequence identifier of the previously received packet.

24. The first communication network device of claim 19, wherein:
the re-ordering unit operable to detect out-of-order delivery of the first packet with respect to the second packet further comprises the re-ordering unit operable to store the first packet in a re-ordering buffer; and
the re-ordering unit operable to re-order the first packet and the second packet further comprises the re-ordering unit operable to re-order the second packet with the first packet previously stored in the re-ordering buffer.

25. The first communication network device of claim 19, wherein the re-ordering unit operable to detect out-of-order delivery of the first packet with respect to the second packet further comprises the re-ordering unit operable to:
determine, based on the secondary sequence identifier of the first packet, whether the first packet is earlier in sequence to a last packet of the plurality of packets that was provided for processing to upper protocol layers of the first communication network device;
discard the first packet at the first communication network device in response to the re-ordering unit determining that the first packet is earlier in sequence to the last packet that was provided for processing to the upper protocol layers; and
re-order the first packet based, at least in part, on the secondary sequence identifier of the first packet in response to the re-ordering unit determining that the first packet is later in sequence to the last packet that was provided for processing to the upper protocol layers.

26. A non-transitory machine-readable storage medium having instructions stored therein, which when executed by a processor causes the processor to perform operations that comprise:
determining primary and secondary sequence identifiers associated with a plurality of packets received at a first network device from a second network device via a plurality of packet routes, wherein a first subset of the plurality of packets are received via a first packet route and a second subset of the plurality of packets are received via a second packet route;

detecting out-of-order delivery of a first packet of the plurality of packets with respect to a second packet based, at least in part, on the secondary sequence identifier of the first packet and the secondary sequence identifier of the second packet of the plurality of packets; and re-ordering the first packet and the second packet based, at least in part, on the secondary sequence identifier of the first packet and the secondary sequence identifier of the second packet in response to said operation of detecting out-of-order delivery of the first packet with respect to the second packet.

27. The non-transitory machine-readable storage medium of claim 26, wherein the operations further comprise:

receiving, at the first network device, a sequence list packet from the second network device that indicates an order in which the second network device will transmit the plurality of packets to the first network device.

28. The non-transitory machine-readable storage medium of claim 26, wherein said operation of determining the primary and secondary sequence identifiers associated with the plurality of packets further comprises:

reading the secondary sequence identifier of the first packet from a header field of the first packet.

29. The non-transitory machine-readable storage medium of claim 26, wherein said operation of determining the primary and secondary sequence identifiers associated with the plurality of packets further comprises:

determining a packet signature of the first packet based, at least in part, on at least one of a header field of the first packet and a payload of the first packet;

comparing the packet signature of the first packet with a plurality of packet signatures in a sequence list packet, wherein the sequence list packet includes a packet signature and a corresponding secondary sequence identifier for each of the plurality of packets, wherein the sequence list packet is provided from the second network device to the first network device;

determining that the packet signature of the first packet matches a first packet signature; and selecting, from the sequence list packet, a first secondary sequence identifier that corresponds to the first packet signature as the secondary sequence identifier of the first packet.

30. The non-transitory machine-readable storage medium of claim 26, wherein said operation of detecting out-of-order delivery of the first packet with respect to the second packet further comprises:

determining whether the secondary sequence identifier of the first packet is in sequence with a secondary sequence identifier of a previously received packet that was previously received at the first network device;

determining that the first packet is in order with the previously received packet in response to determining that the secondary sequence identifier of the first packet is in sequence with the secondary sequence identifier of the previously received packet; and determining that the first packet is out-of-order with reference to the previously received packet in response to determining that the secondary sequence identifier of the first packet is not in sequence with the secondary sequence identifier of the previously received packet.

* * * * *